United States Patent [19]
Abnett et al.

[11] 3,796,867
[45] Mar. 12, 1974

[54] ANGLE MODE AREA NAVIGATION COMPUTER

[75] Inventors: Albert C. Abnett, Westerville; Robert M. Watson, Uniontown, both of Ohio

[73] Assignee: Autech, Inc., Columbus, Ohio

[22] Filed: June 6, 1972

[21] Appl. No.: 260,194

[52] U.S. Cl........ 235/150.27, 235/150.26, 235/190, 343/106 R, 343/112 C
[51] Int. Cl.............................................. G06g 7/78
[58] Field of Search....... 235/150.2, 150.26, 150.27, 235/186, 190; 343/10, 15, 106 R, 107, 112 C, 112 D

[56] References Cited
UNITED STATES PATENTS

| | | | |
|---|---|---|---|
| 3,581,073 | 5/1971 | Visher | 235/150.26 |
| 3,500,413 | 3/1970 | Dohogne et al. | 343/107 |
| 3,652,837 | 3/1972 | Perkins | 235/150.27 |
| 3,659,291 | 4/1972 | Anthony | 343/106 R X |
| 3,534,399 | 10/1970 | Hirsch | 235/150.27 |
| 3,643,074 | 2/1972 | Hobbs | 235/150.27 |
| 3,090,958 | 5/1963 | Brown | 235/190 X |
| 3,685,053 | 8/1972 | Kirkpatrick | 343/106 R |

*Primary Examiner*—Malcolm A. Morrison
*Assistant Examiner*—Jerry Smith
*Attorney, Agent, or Firm*—LeBlanc & Shur

[57] ABSTRACT

Disclosed is an area navigation system which generates course deviation information in terms of angular measurement. The system is compatible with all standard VOR and DME equipment. It comprises a vector computer for computing the "C" vector from a waypoint to an aircraft and from the computer output generates a voltage signal representative of distance and a variable phase signal representative of varying angle. It incorporates an approach mode switch for maintaining an approximately constant maximum angular course width sensitivity in the area of the waypoint.

29 Claims, 17 Drawing Figures

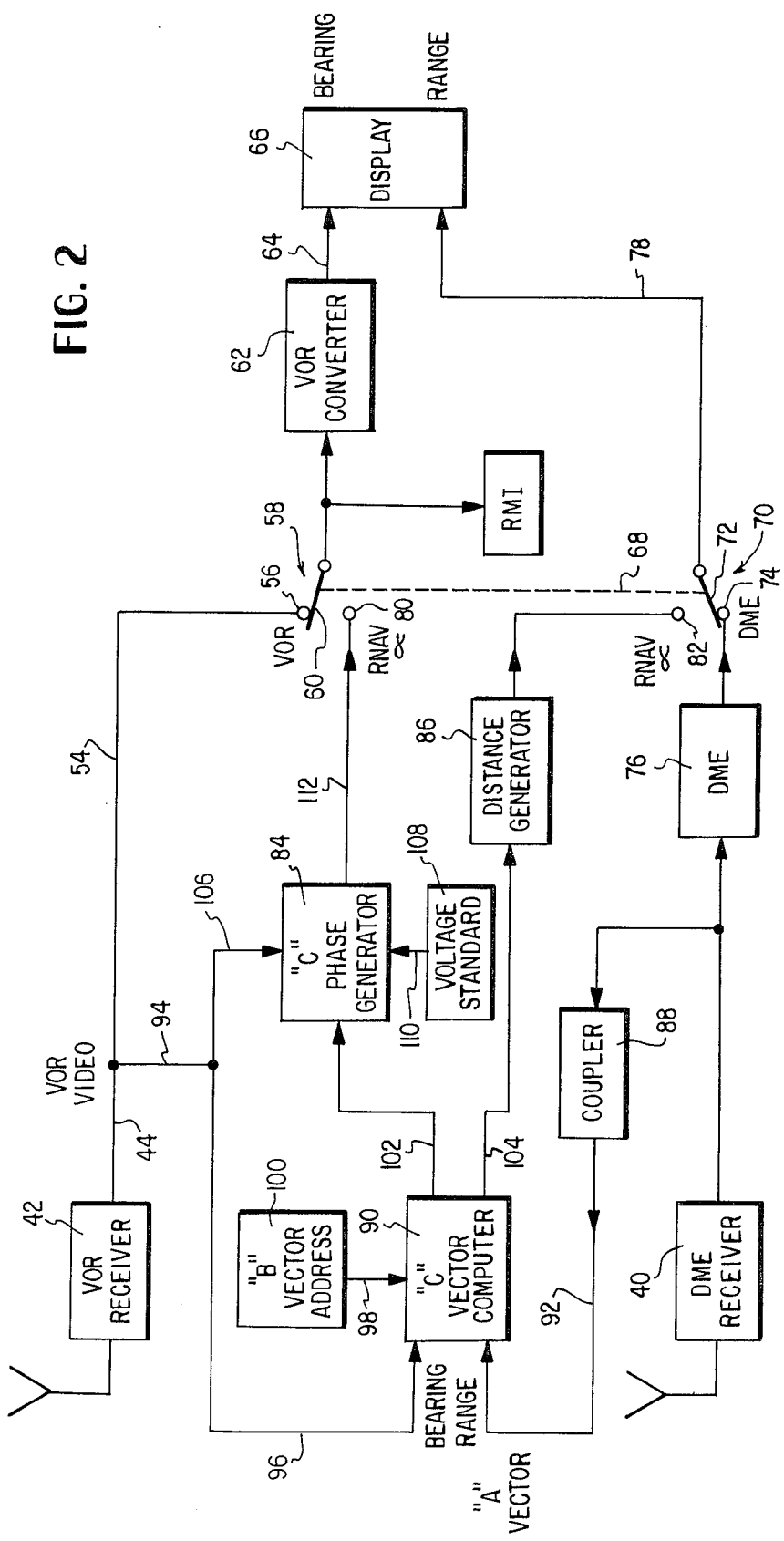

FIG. 9B

ANGLE MODE AREA NAVIGATION COMPUTER

This invention relates to area navigation systems and more particularly to an area navigation computer which presents course deviation information in terms of angular measurement. It is fully compatible with existing VOR and DME equipment and presents information to the aircraft pilot in a conventional VORTAC format.

The concept of area navigation is an outgrowth of the availability of a wide spread network of air navigation aids called VORTACs. These combine the capabilities of standard VHF omni-directional range (VOR) equipment with the tactical air navigation TACAN system to provide radial signals which are utilized on board aircraft to provide azmuth (bearing) and range information for the aircraft with respect to the VORTAC facility. Thus, an aircraft suitably equipped with VOR and DME (distance measuring equipment) receivers can locate its bearing and range relative to a VORTAC station. By reference to chart showing the VORTAC location, the absolute position of the aircraft may readily be ascertained. The resulting information is customarily utilized to maintain a course between a succession of VORTAC facilities along the desired course. Suitable on board indicators show range data and left-right deviation with respect to a selected course to or from the VORTAC. The left-right information is conventionally displayed in terms of the angular deviation of the aircraft from the desired course to the VORTAC.

To alleviate the inevitable overcrowding of established airways between VORTACs, area navigation may be used to pilot a course across country, i.e., off the established airways. Such a course can be along tracks parallel to established airways between VORTACs or simply between a series of arbitrary or phantom points, usually referred to as "waypoints" within a range of succession of VORTAC facilities near the desired course.

In practice, the series of waypoints are defined by the range and bearing to a nearby VORTAC. An on board navigation computer solves the vector triangle defined by the VORTAC to aircraft and VORTAC to waypoint vectors to generate a third vector commonly called a "C" vector representing the range and azmuth or bearing from the waypoint to the aircraft. This is fully equivalent to the VORTAC to aircraft vector in terms of locating the aircraft, and navigation with respect to the waypoints proceeds as it would with direct reference to the VORTACs themselves. Because a waypoint may be located arbitrarily (but within the range of the reference VORTAC) the pilot is no longer constrained to flight along or near the established airways but instead may fly along any convenient course to his particular destination.

From the above, it may be appreciated that an area navigation system must include a suitable VOR or NAV receiver, and a DME receiver to generate the bearing and range components for the VORTAC to aircraft vector and the area navigation computer must include means to generate the VORTAC to waypoint vector, and equipment to solve the vector triangle to generate the waypoint to aircraft vector. In addition, suitable display equipment must be provided to make the area navigation data conveniently usable by the pilot.

Complete area navigation systems including all of the foregoing are available from several sources. One such system has become the standard for use in commercial aviation and is a highly effective and useful piece of equipment. However, such equipment is quite expensive and is consequently beyond the means of most general aviation pilots.

Less expensive area navigation systems are available from other sources, but these suffer from several disadvantages. For example, considering all the required components, the systems are still quite costly, whereby pilots typically purchase the required equipment in stages, beginning with the VOR receiver, and then the DME receiver which are usable for standard VOR and VOR-DME navigation. Thus, while the area navigation computers are obtainable separately, computers available from one source are seldom compatible with other system components provided by other suppliers. This may significantly limit a potential purchase in the choice of new equipment. This is a significant consideration since it is estimated that well over one hundred thousand operational aircraft are already equipped with VOR and DME receivers, few of which already have area navigation capabilities. An important feature of the area navigation computer of the present invention is its compatibility with all known VOR and DME equipment.

In order to overcome these and other problems, there is disclosed in assignee's copending application Ser. No. 219,992 filed Jan. 24, 1972 in the name of Stephen F. Bean a novel distance mode area navigation computer. The present invention is directed to a generally similar system in which the bearing information is provided in an angular mode instead of in a distance mode. The angular mode presentation possesses several important advantages, not the least of which is the fact that it corresponds to the presentation normally made in conventional VOR or VORTAC navigation with which most airline pilots are already thoroughly familiar. Pilot familiarity with the form of display is a significant safety feature in that aircraft navigational experience with the angular display substantially lessens the possibility of pilot error and risk of accident. Another important advantage resulting from angular presentation of bearing information lies in the fact that the course deviation information becomes more accurate as the waypoint is approached and just at the time when more accuracy is needed.

In the present invention, the area navigation computer is coupled to a conventional VOR receiver for receiving bearing or azmuth information from a VORTAC and to a conventional DME receiver for receiving distance or range information from the VORTAC station. Incorporated in the system is a switch so that the pilot at his option may switch over to VORTAC and fly to the VORTAC station in a conventional manner. When the system is manually switched to "RNAVα" (area navigation — angular) the pilot may fly to a waypoint using exactly the same instrument display and visual guides that he would use in flying "straight" VORTAC. The VOR video information containing the bearing between the VORTAC and the aircraft is applied to a "C" vector computer. This video signal contains a 30 Hz variable phase sinusoid representing the bearing portion of the "A" vector between the VORTAC and the aircraft, which variable phase 30 Hz signal constitutes part of the "A" vector and is hereinafter referred to as the "A" phase. Also supplied to the "C" vector computer is a signal from the DME receiver representing the range or distance portion of the "A" vector. With the aid of maps and a knowledge of the location of the VORTAC station, the aircraft pilot dials into the "C" vector computer the "B" vector address which consists of the bearing and distance information defining the "B" vector between the VORTAC station and the selected waypoint. Using the information put into the computer by the pilot defining the known "B" vector and the bearing and range information from the VOR and DME receivers defining the "A" vector, the computer solves the vector triangle and produces an electrical output representative of the "C" vector, i.e., the vector between the waypoint and the aircraft.

The output from the "C" vector computer is a 30 Hz sinusoid having a magnitude representative of the distance from the waypoint to the aircraft and a phase angle relative to the VORTAC standard or zero degrees reference (ZDR) indicative of the bearing from the waypoint to the aircraft. The "C" vector output is applied to a distance generator which senses the amplitude of this signal and applies a corresponding distance signal to the range portion of the pilot's cockpit display.

The "C" vector computer output is also applied to a "C" phase generator which normalizes the "C" vector magnitude and then combines it with the 9,969 Hz component of the original VOR video signal to produce a reconstituted VOR video having a 30 Hz variable phase sinusoidal component representative of the bearing of the "C" vector. This signal is applied to a conventional VOR converter and finally to a course deviation indicator (CDI) which produces an angular display to the pilot of bearing information.

Additional important features of the present invention include the fact that the reconstituted VOR video or "RNAV$\alpha$" signal containing the "C" phase information may be applied directly to a conventional automatic VOR radio magnetic indicator (RMI) to display heading data and not just bearing. In addition the area navigation system of the present invention includes an approach mode switch for producing an increased and substantially constant angular course width in the course deviation indicator (CDI) in the area of the waypoint. This feature is particularly advantageous in those situations in which the pilot desires to land at or near the waypoint.

It is therefore one object of the present invention to provide an improved area navigation system.

Another object of the present invention is to provide an improved area navigation system which incorporates an angular display of bearing information.

Another object of the present invention is to provide an improved on board area navigation computer.

Another object of the present invention is to provide an area navigation computer which is completely compatible with existing VOR and DME navigation receivers.

Another object of the present invention is to provide an area navigation system in which the pilot can fly from waypoint to waypoint in the same manner that he would conventionally fly from VORTAC station to VORTAC station with conventional VOR and DME receiving equipment.

Another object of the present invention is to provide on board area navigation display which provides the same information in the same format for a waypoint as is supplied by conventional equipment for a VORTAC station.

Another object of the present invention is to provide an improved area navigation computer which produces a reconstituted VOR video signal having essentially the same properties representative of the "C" vector as the conventional VOR signal has for the "A" vector.

Another object of the present invention is to provide an improved area navigation system which through a simple flip of the switch may be converted from straight VORTAC to area navigation and vice versa.

Another object of the present invention is to provide an angular mode area navigation system having an approach mode switch for establishing a substantially constant course width in a course deviation indicator.

Another object of the invention is to provide for use of more than one VOR receiver and/or CDI and VOR converter.

These and further objects and advantages of the invention will be more apparent upon reference to the following specification, claims and appended drawings wherein:

FIG. 2 is a simplified block diagram of an angle mode area navigation system in accordance with the present invention;

Figure 6:
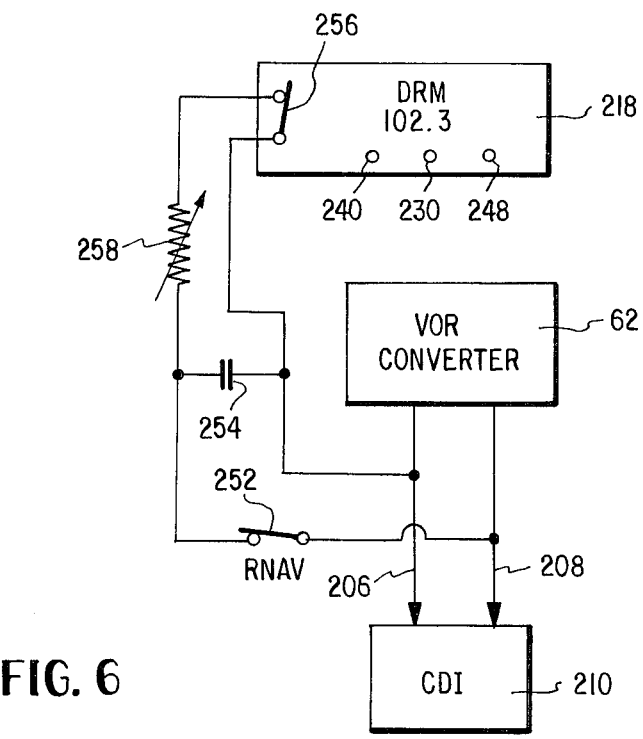
Figure 5A:
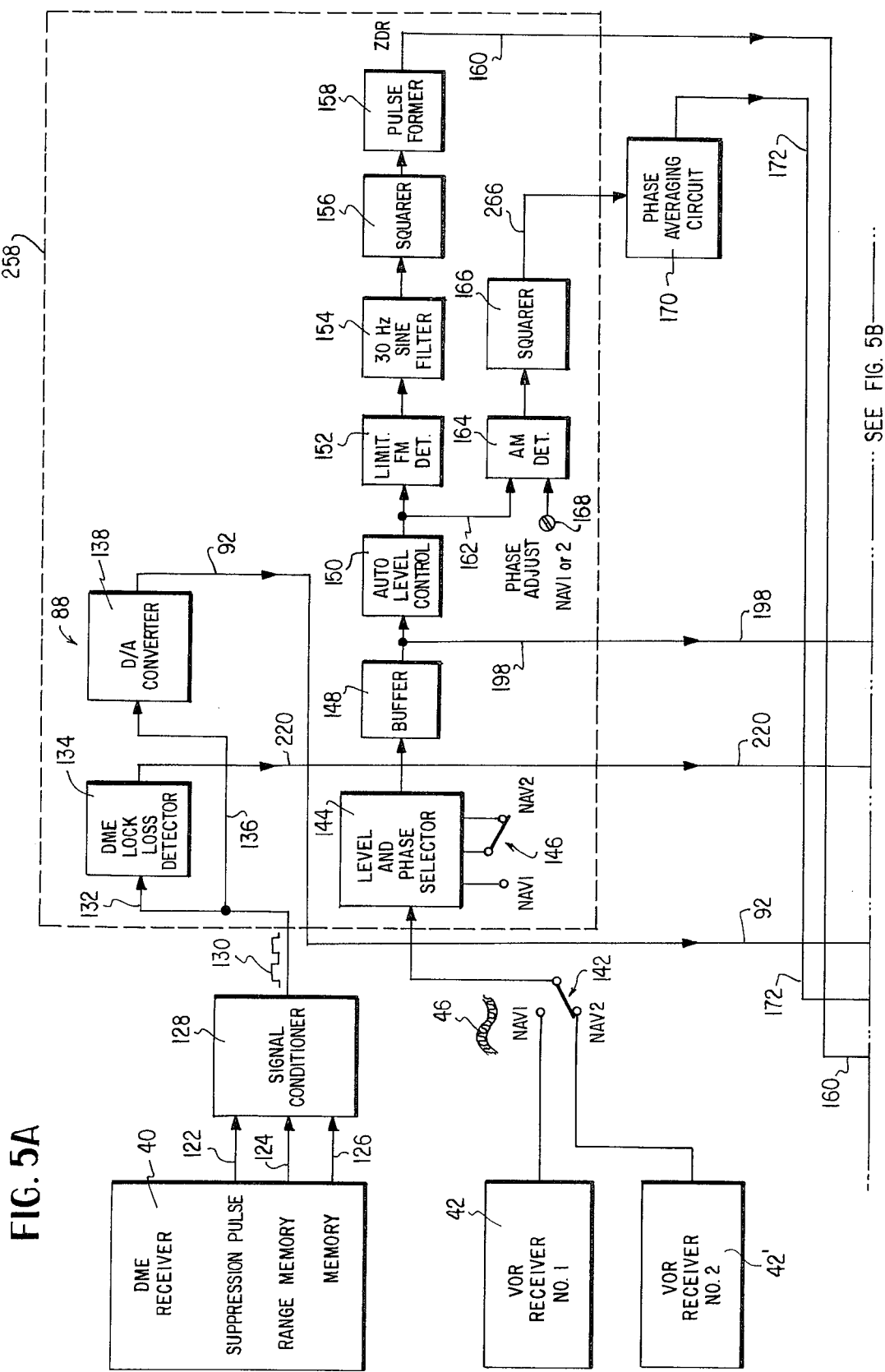
Figure 5B:
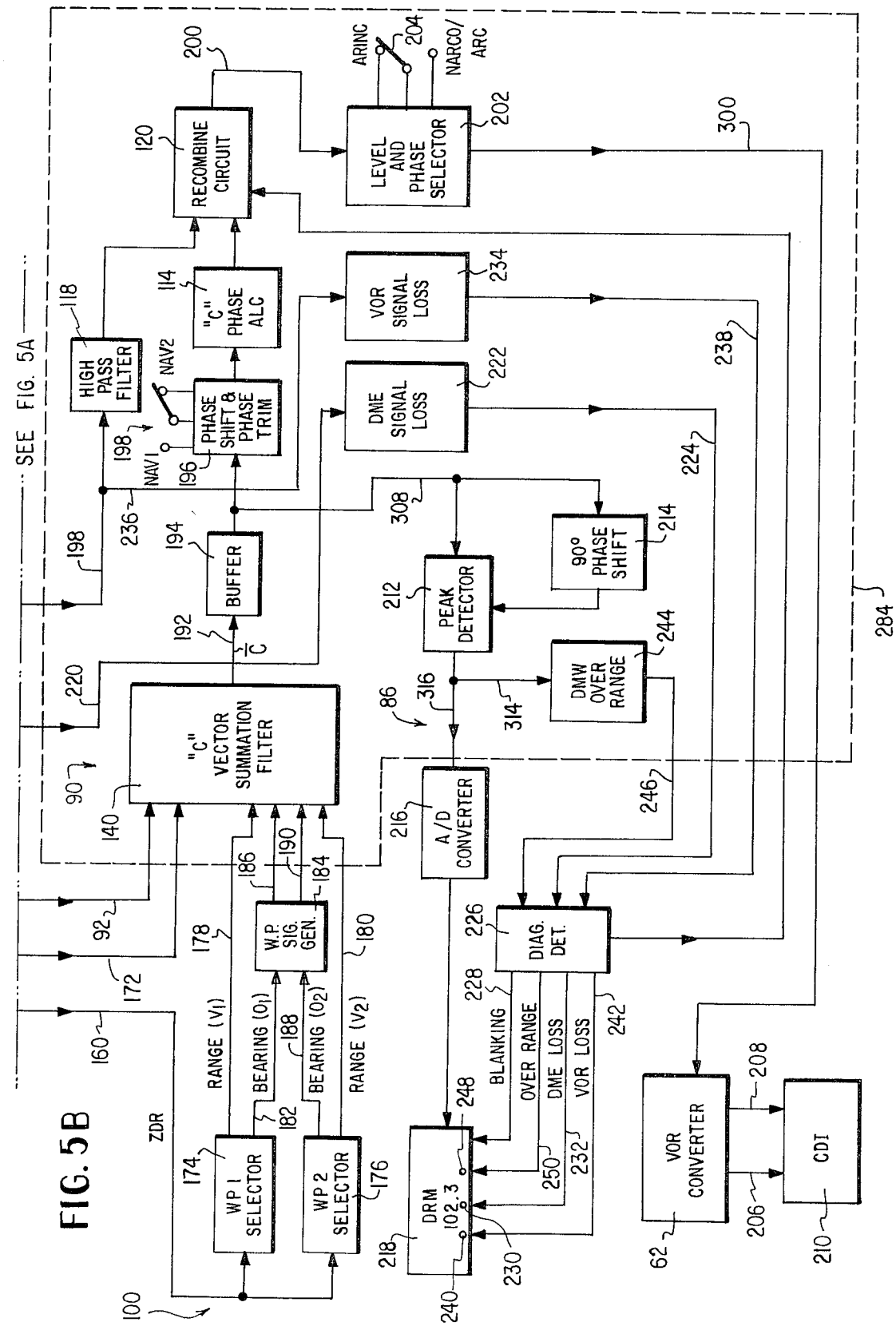
Figure 7A:
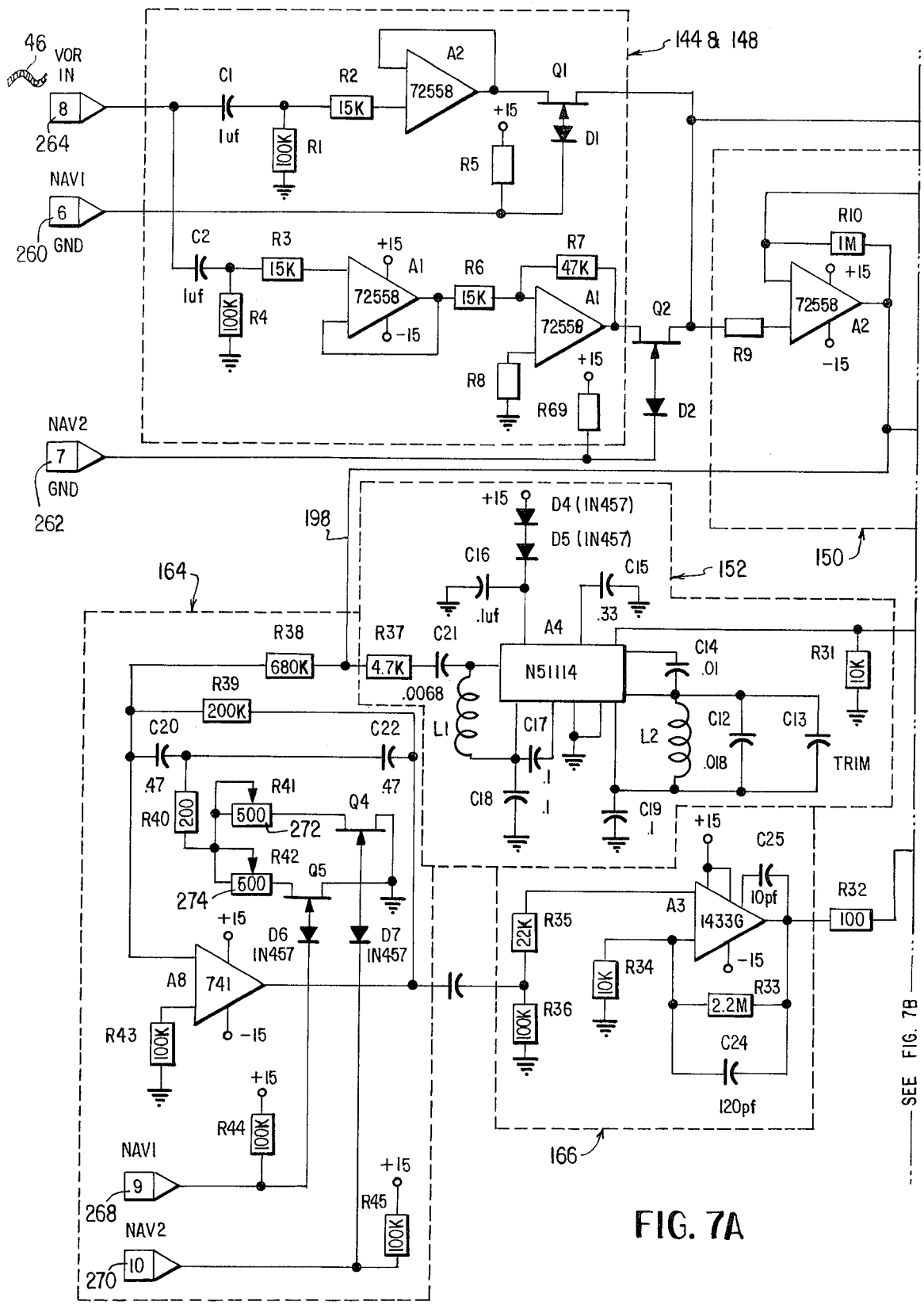
Figure 7B:
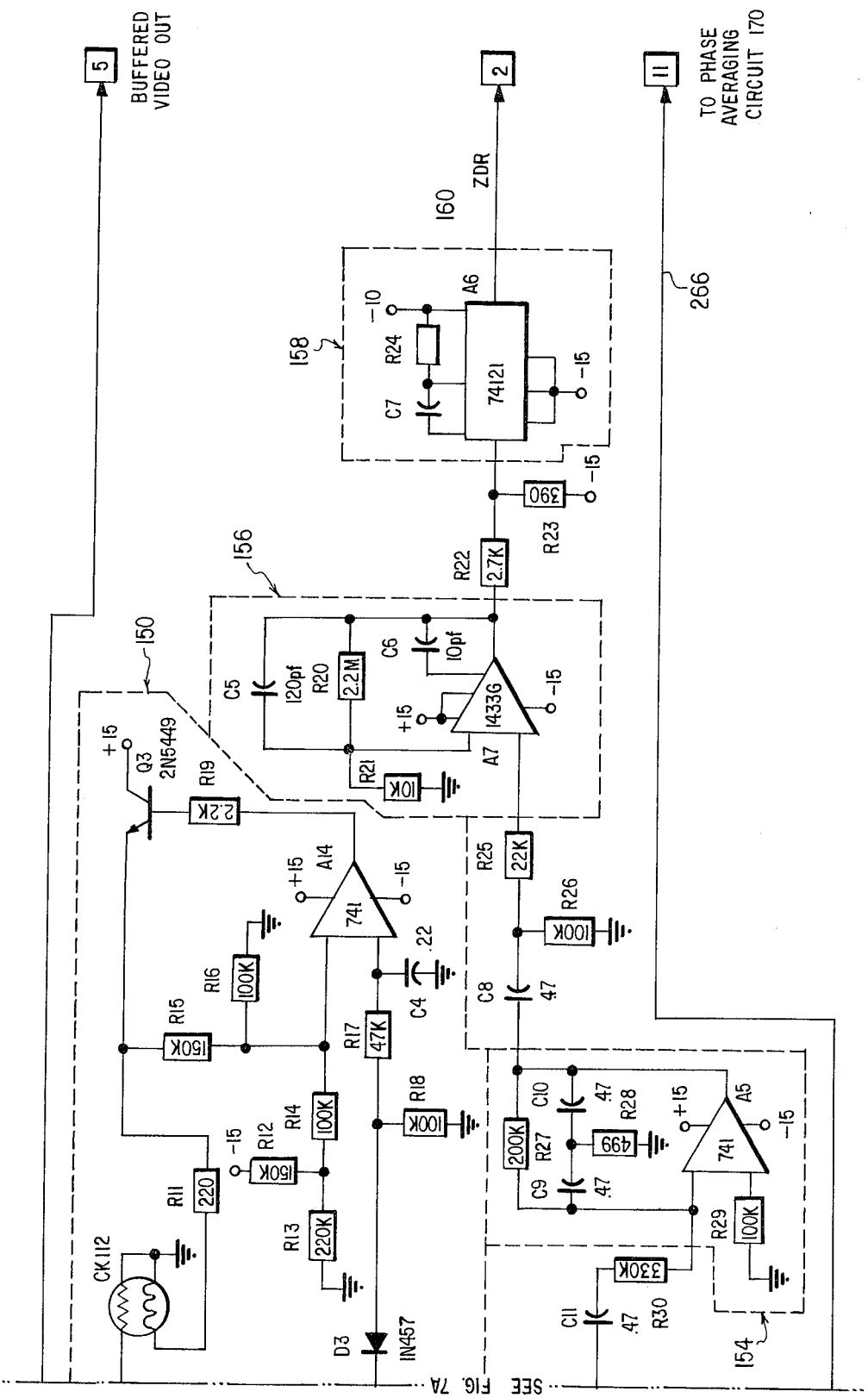
Figure 7C:
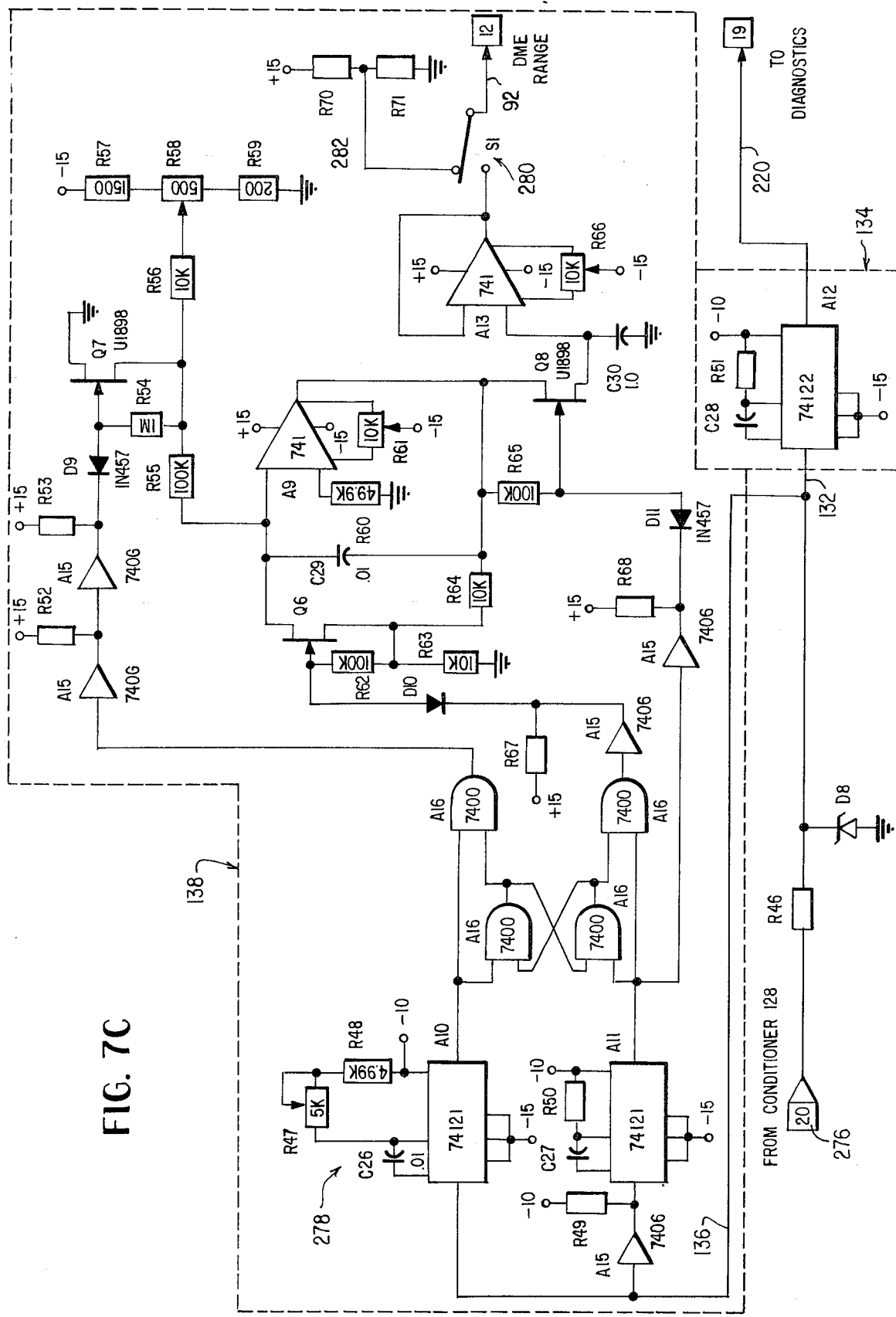
Figure 8A:
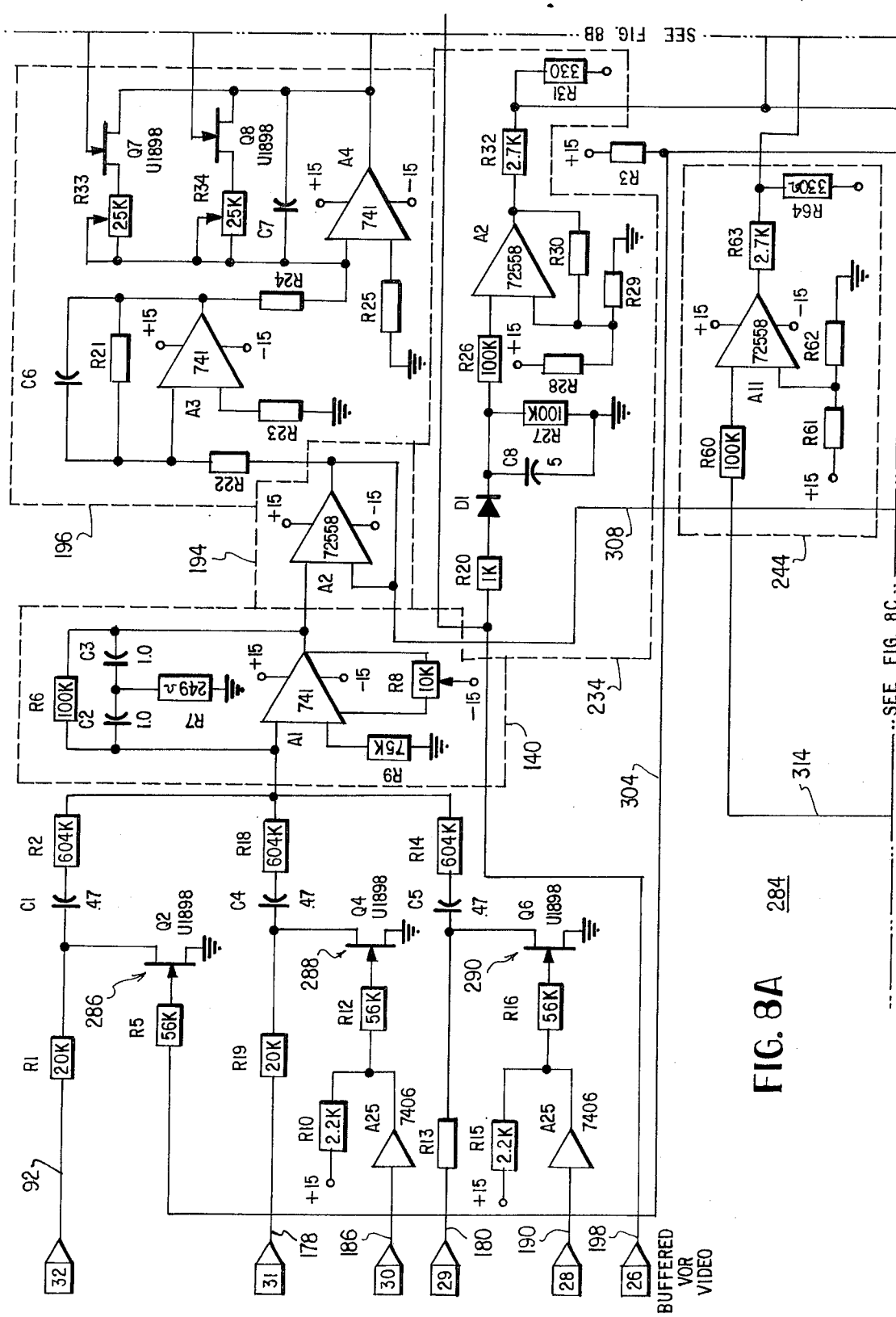
Figure 8B:
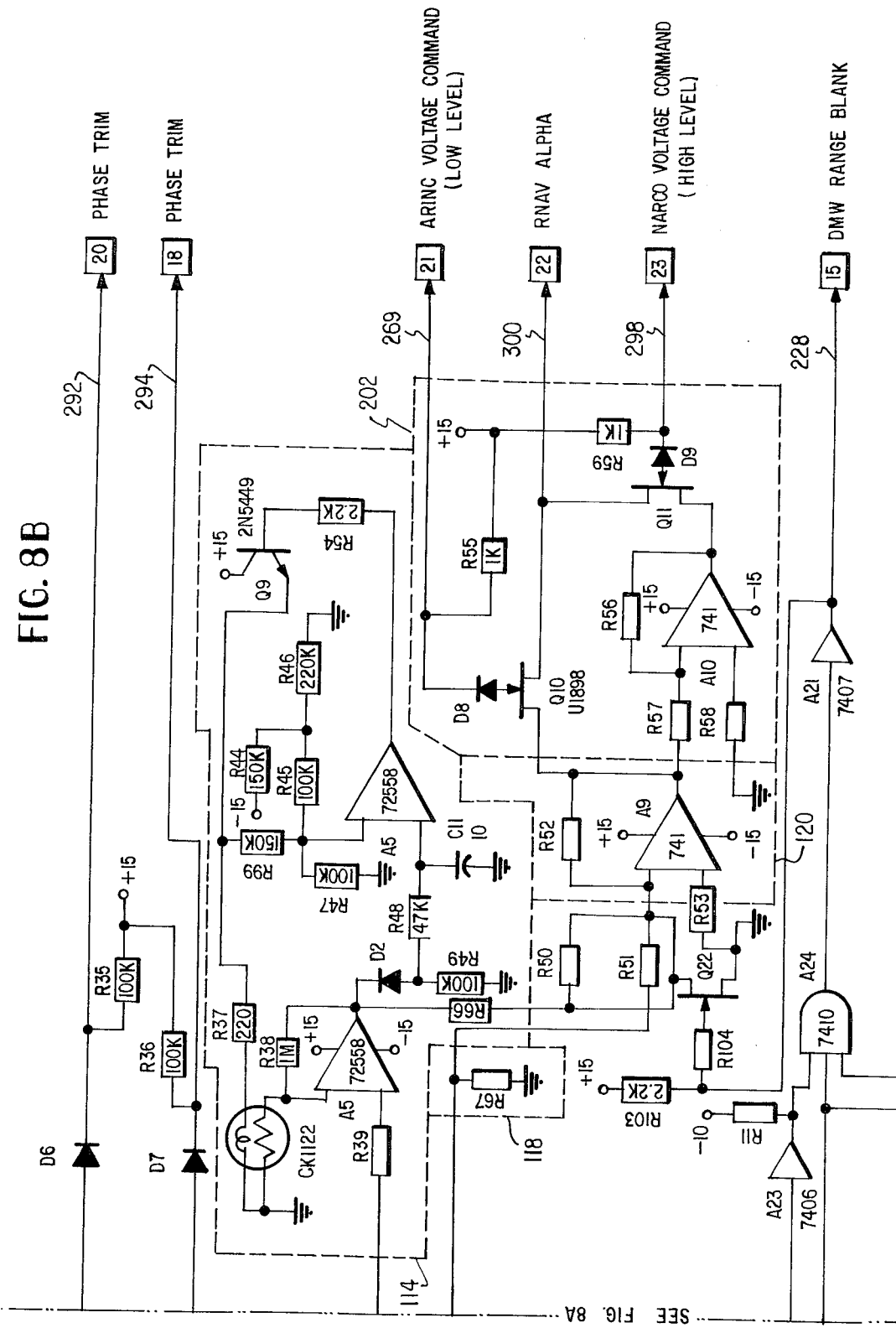
Figure 8C:
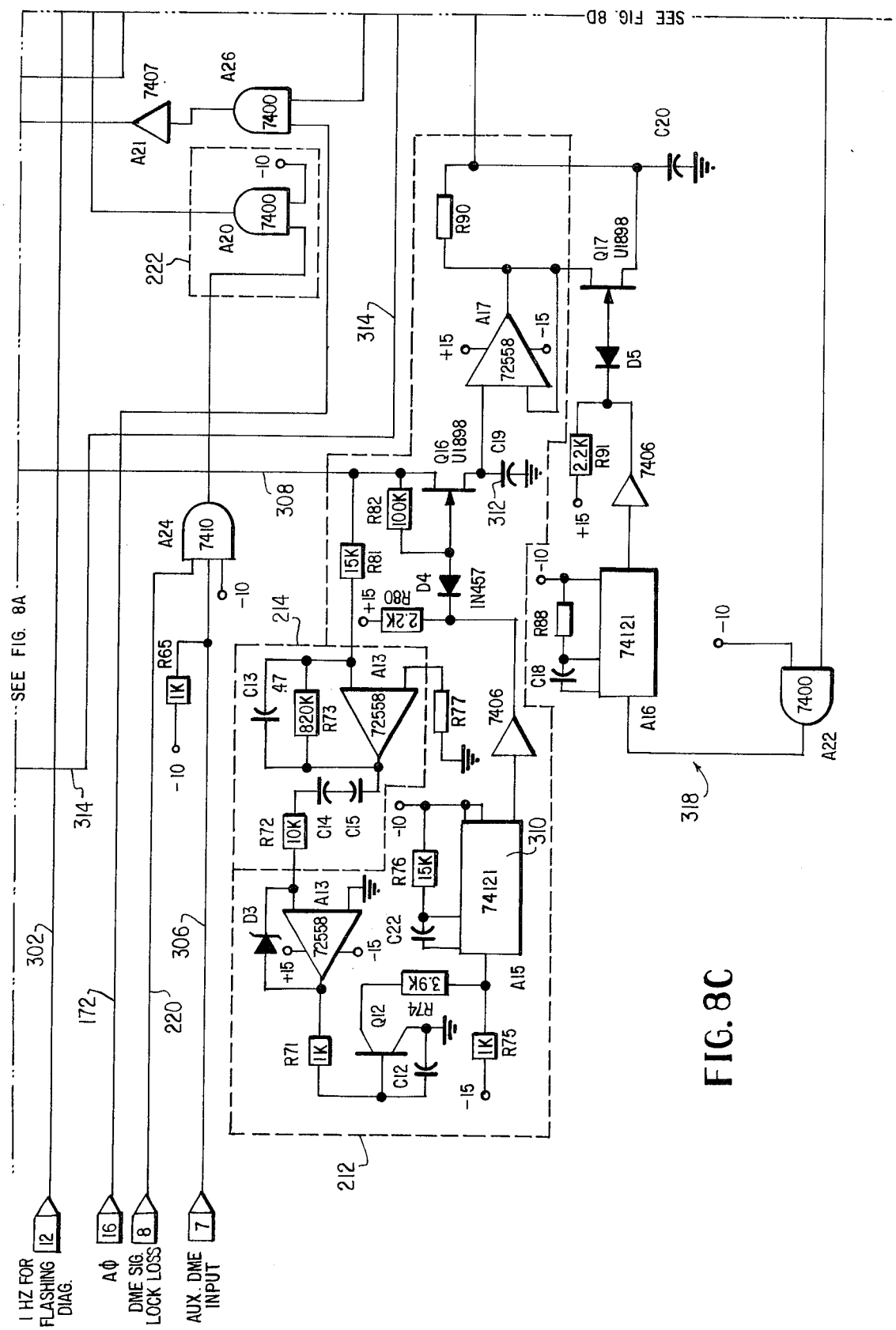
Figure 8D:
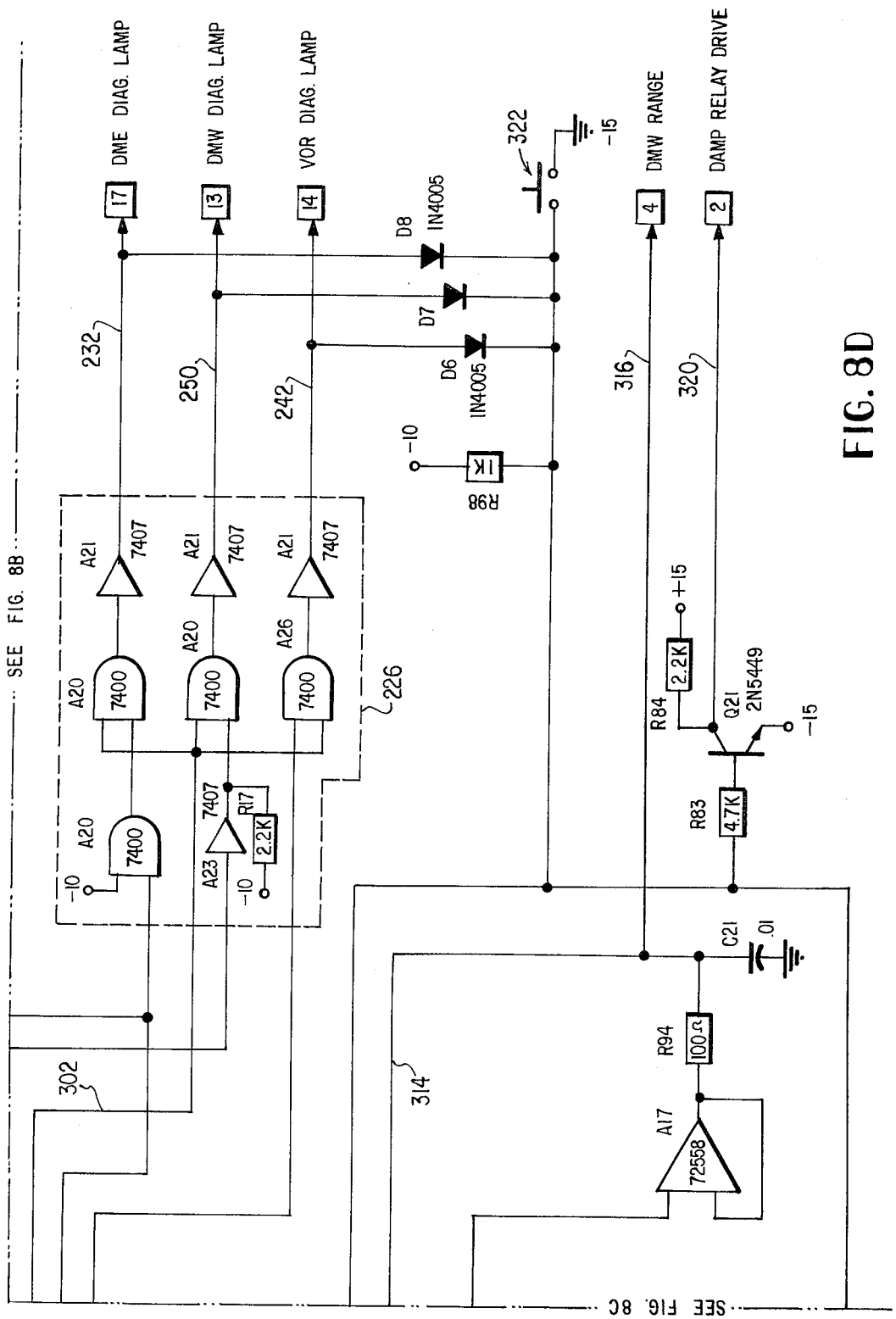
Figure 9A:
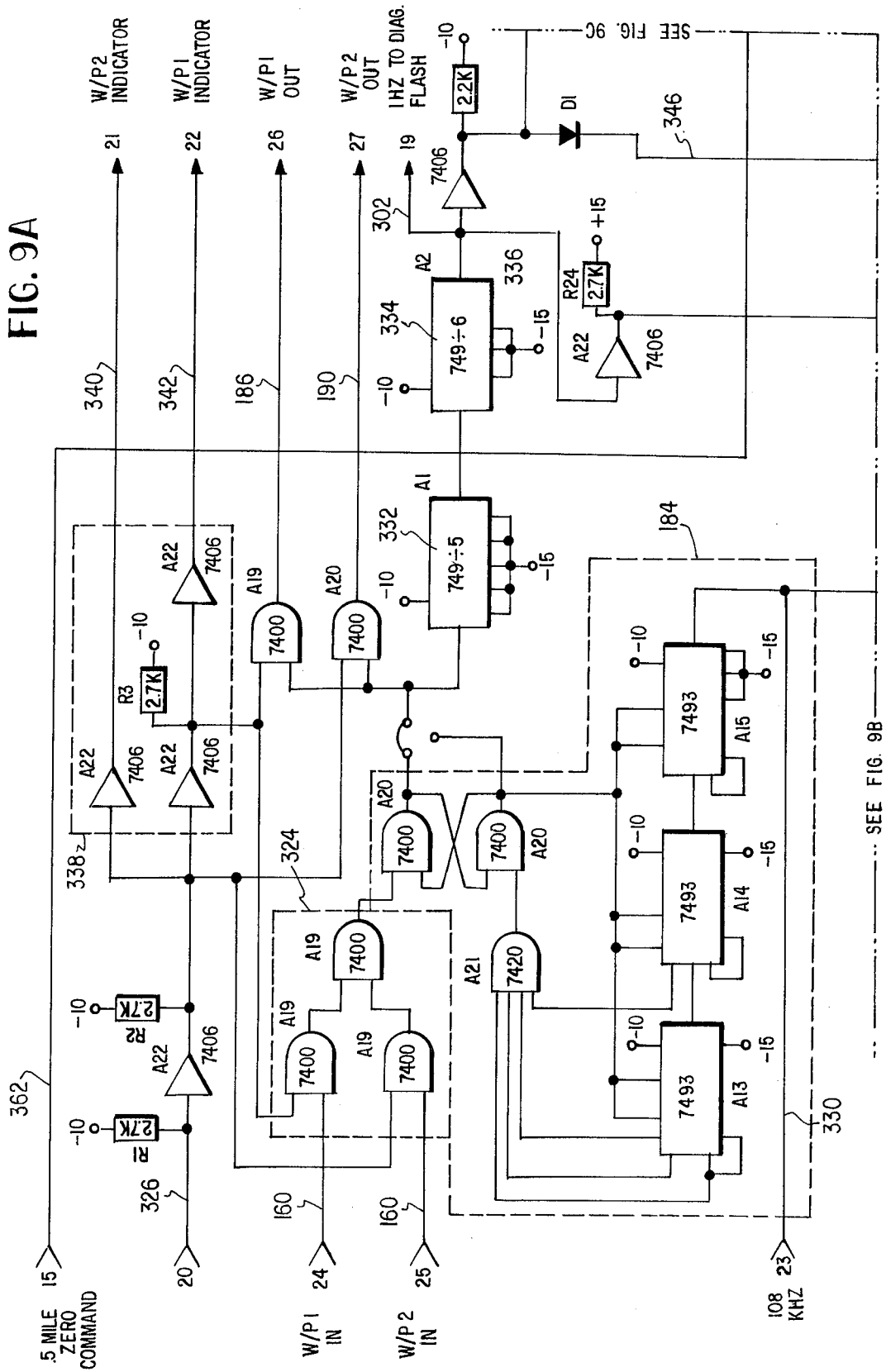
Figure 9C:
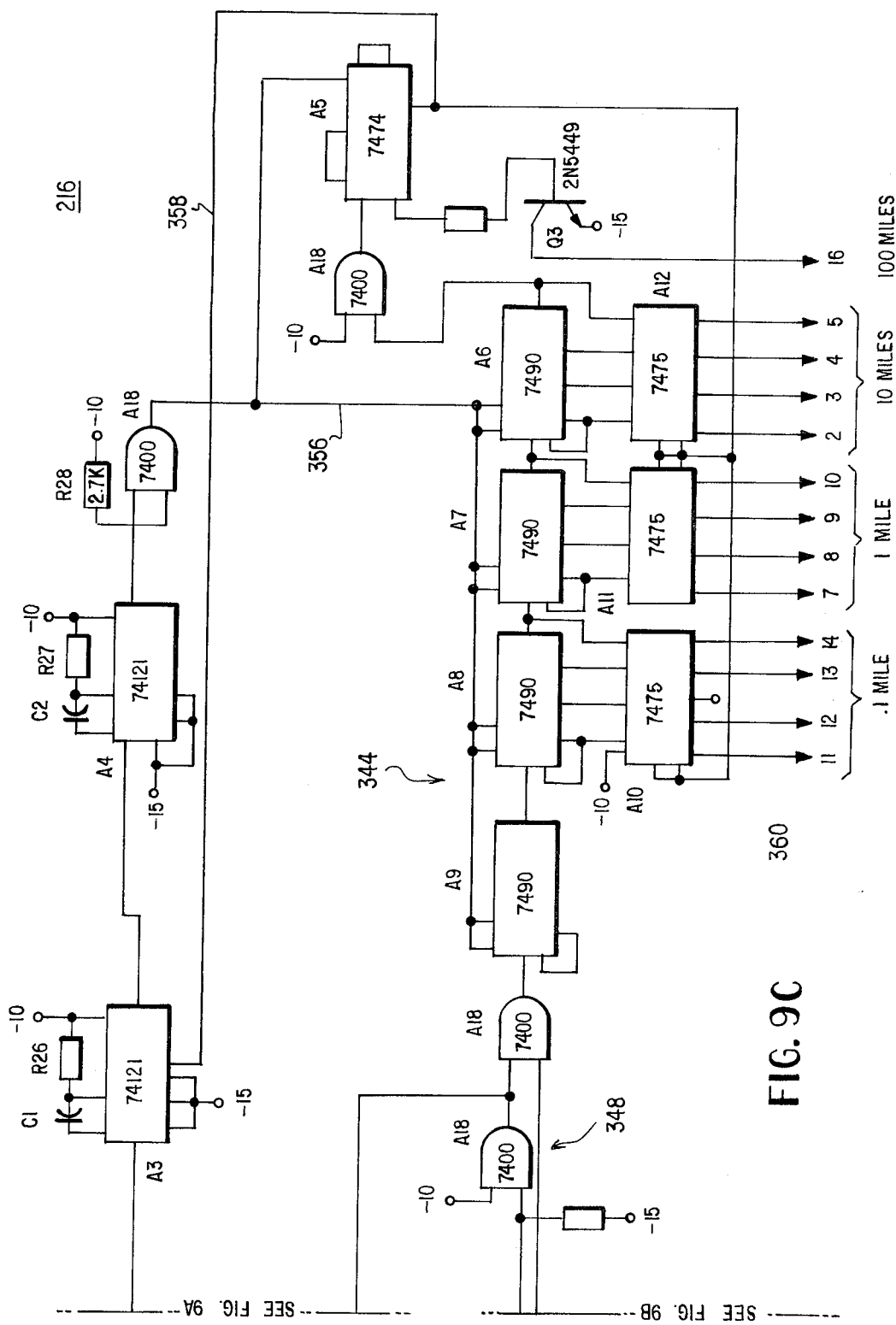

FIGS. 5A and 5B, taken together, show a detailed block diagram of the area navigation system of the present invention as illustrated in FIG. 2;

FIG. 6 is a block diagram illustrating CDI damping and showing the approach mode switch forming a part of the present invention;

FIGS. 7A, 7B and 7C, taken together, constitute a detailed circuit diagram of the VOR–DME portion of the block diagram of FIGS. 5A and 5B;

FIGS. 8A, 8B, 8C, and 8D, taken together, constitute a detailed circuit diagram of the computer portion of the block diagram of FIGS. 5A and 5B; and FIGS. 9A, 9B and 9C, taken together, constitute a detailed circuit diagram of the digital portion of the block diagram of FIGS. 5A and 5B.

Figure 1:
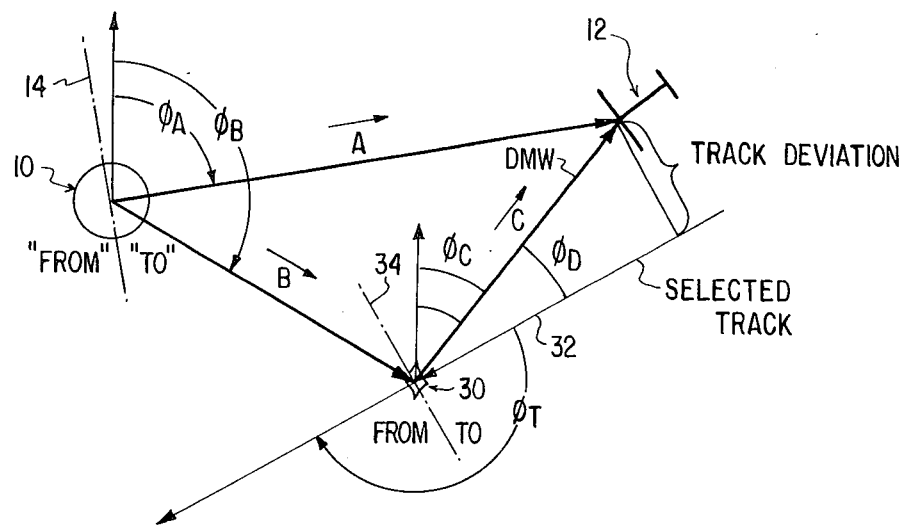
FIG. 1 is a vector diagram useful in the understanding of the underlying concepts of area navigation.

Referring to the drawings, in FIG. 1 there is illustrated a VORTAC station 10 and an aircraft 12 located in an arbitrary position with respect to station 10. The position of the aircraft with respect to the VORTAC is ordinarily defined in terms of a vector $\overline{A}$ having a magnitude $/A/$ and an azmuth or bearing (with respect to North) of $\phi_A$. (Conventionally, vectors emanating from a VORTAC are termed "radials", and the A vector in FIG. 1 coincides with the $\phi_A$ radial of VORTAC 10. The inverse of the angle $\phi_A$, $\phi_A + 180°$, is the aircraft bearing to the VORTAC.)

In conventional VOR navigation the magnitude $/A/$ and the angle $\phi_A$ are computed, and utilized to locate the aircraft relative to the VORTAC and relative to a selected course, i.e., a desired bearing of approach toward the VORTAC. A "left-right" course deviation indicator (CDI) provides a measure of how many degrees to the left or right the aircraft bearing must be changed to intercept the desired course. A "to-from" indicator is normally provided as a part of the course deviation indicator. The "to" indication is given if the course deviation angle (i.e., desired bearing minus actual bearing) is within plus or minus 90°. The "from" indication is given in the course deviation angle is more than 90° or less than minus 90°. The dashed line 14 in FIG. 1 represents the "to-from" boundary assuming vector $\overline{A}$ in fact to be the selected course.

For area navigation the pilot establishes a succession of arbitrary landmarks, such as that denoted 30, and commonly called waypoints. Waypoint 30 has a known bearing $\phi_B$ and a range /B/ with respect to a VORTAC such as 10 in its vicinity, thereby defining the vector $\overline{B}$ from the VORTAC to the waypoint. The triangle defined by vectors $\overline{A}$ and $\overline{B}$ includes a third side $\overline{C}$ defining an azmuth angle $\phi_C$ and a range /C/ of the aircraft with respect to the waypoint. Since the components of the vector $\overline{A}$ are determined by the incoming VOR and DME data, and since the components of the vector $\overline{B}$ may be determined for a selected waypoint from a suitable navigational chart, the $\overline{C}$ vector can be determined by the vector subtraction $\overline{A} - \overline{B}$. Once this is done, the navigator using an area navigation system may treat the vector $\overline{C}$ in precisely the same manner as the navigator using standard VOR/DME techniques would treat the vector $\overline{A}$.

In particular, a selected track 32, analogous to the "selected course" mentioned above, may be defined as the desired bearing of the aircraft as it approaches the waypoint, and a track deviation angle $\phi_D$ computed as the difference between the actual bearing of the aircraft from the waypoint ($180°+\phi_C$) and its desired bearing $\phi_T$ on the selected track, i.e., $\phi_D = 180° + \phi_T - \phi_C$. Then having measured (actually computed) the range /C/, this range can be displayed as a distance on an appropriate indicator, or this distance may be displayed on an existing indicator already present which otherwise would be displaying DME distance from the VORTAC. The angular quantity $\phi_D$ is displayed on a conventional CDI (course deviation indicator). This indicator is a left-right indicating the course deviation in degrees and as in conventional VOR navigation a "to-from" indicator is used to show whether the aircraft is more or less 90° off the selected track. (See line 34 in FIG. 1.

The aircraft may now be flown from waypoint to waypoint without need to follow crowded airways between VORTACs, thereby improving flight safety and often reducing flight time by allowing selection of a direct route to a destination.

The apparatus of the present invention utilizes the above-described concepts of area navigation in a highly advantageous manner. The essential features of one preferred embodiment of the present invention are illustrated in the block diagram of FIG. 2.

Data from which the vector $\overline{A}$ is generated is received from a nearby VORTAC by a DME receiver 40 and a VOR or "NAV" receiver 42. In accordance with an important feature of this invention, receivers 40 and 42 are conventional units available from a variety of sources, and are often already present in the aircraft for use in normal VOR/DME navigation before the owner decides to add the area navigation capability. Such compatibility can significantly reduce the cost of installation, particularly since replacement of a costly receiver, navigation converter and/or display is not necessary and also allows a wide range of equipment selection for a user fitting out an aircraft with a complete installation.

Figure 3:
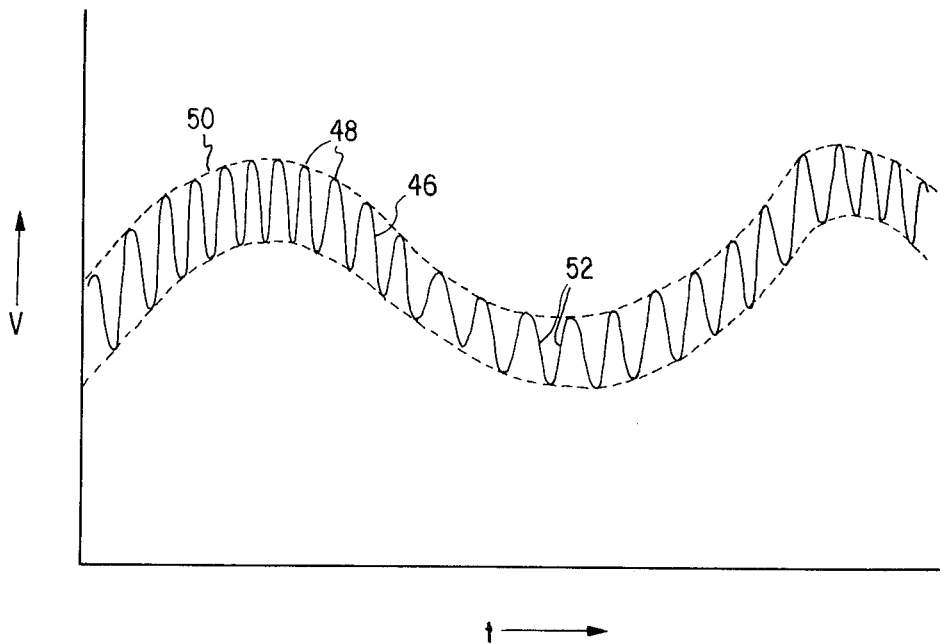
FIG. 3 illustrates the wave form of a conventional VOR video signal as it appears at the output of a conventional VOR receiver.

As is well known, the tactical air navigation (TACAN) portion of a conventional VORTAC station incorporates a transponder which processes a pulse signal from the DME receiver 40 of FIG. 2 so as to indicate the distance from the VORTAC station to the aircraft. At the same time the VHF omni-directional range (VOR) portion of the VORTAC station transmits a composite bearing signal having a carrier frequency somewhere in the 108.0 – 117.95 mHz band. The VOR carrier is removed in the VOR receiver 42 so that the VOR output on lead 44 in FIG. 2 is a composite bearing signal of the type illustrated in FIG. 3 and commonly referred to as a VOR video. The VOR video 46 illustrated in FIG. 3 comprises a subcarrier 48 having a frequency of 9,960 Hz. The 9,960 Hz subcarrier is received superimposed on a 30 Hz sine wave as indicated in FIG. 3 by the wave envelope 50. This 30 Hz signal component as produced by the VOR receiver 42 of FIG. 2 is of variable phase depending on the position of the aircraft relative to the VORTAC station and is caused by the rotation of the VORTAC station antenna. The 9,960 Hz subcarrier 48 is also frequency modulated as indicated by the increased spacing in FIG. 3 at 52. This frequency modulation is also at a frequency of 30 Hz and constitutes the reference phase or zero degree reference (ZDR) of the VOR video. When the aircraft is due North of the VORTAC station the two 30 Hz sine waves are exactly in phase. The amount by which the amplitude modulating sine wave is out-of-phase with the frequency modulating ZDR is an indication of the bearing of the aircraft from the VORTAC.

Referring again to FIG. 2, the VOR video on the lead 44 may be supplied directly by way of a lead 54 to the VOR terminal 56 of a manually-operated switch 58. When the movable contact 60 of switch 58 engages VOR terminal 56 the VOR video is supplied directly to a conventional VOR converter 62 and from there by way of a lead 64 to the bearing indicator of the cockpit display generally indicated at 66. Switch 58 is preferably ganged as indicated by the dash line 68 with a second switch 70 having a movable contact 72. When movable contact 60 of switch 58 engages VOR terminal 56, movable contact 72 of switch 70 engages a DME terminal 74, so that DME receiver 40 is connected through distance circuit (DME) 76 by way of a lead 78 to the range portion of the cockpit display 66. Display 66 may be of any conventional construction including the type which provides both bearing and range information for ready viewing by the pilot in the aircraft cockpit. Alternatively the bearing data can be displayed on a conventional CDI or HSI and the range (to the waypoint) displayed on an indicator separate from that showing DME distance. In such an arrangement the pilot will have both DME distance (to the VORTAC) and waypoint range displayed simultaneously.

The position of movable switch contacts 60 and 72 in FIG. 2 is the "normal" position of the contacts and is used for straight VOR/DME or straight VORTAC navigation. In order to provide an area navigation capability, movable contacts 60 and 72 are moved by the pilot to the respective "RNAV$\alpha$" (area navigation — angular) terminals 80 and 82. This movement of the switch contacts connects the VOR converter 62 to the output of a "C" phase generator 84 and at the same time connects the range display to the output of a distance generator 86.

As will be recalled in connection with the description of FIG. 1, the vector from the VORTAC station to the aircraft is commonly called the A vector; the vector from the VORTAC station to the waypoint is commonly called the B vector; and the vector from the waypoint to the aircraft is commonly called the C vector. The distance information for the A vector is supplied from DME receiver 40 through a coupler 88 to the range input of a "C" vector computer 90. Coupler 88 converts the pulse output of the DME receiver 40 into a signal on lead 92 so that it may be accepted by computer 90. Bearing information for the A vector incorporated in the composite VOR video is supplied from the output of VOR receiver 42 by way of lead 44 and additional leads 94 and 96 to the bearing input of the C vector computer 90. The B vector information is supplied to "C" vector computer 90 by way of a lead 98 from a waypoint selector 100. Using available navigation charts, the pilot manually dials into waypoint selector 100 the necessary range and bearing information for the B vector and this is supplied as a B vector address from waypoint selector 100 by way of lead 98 to "C" vector computer 90. Waypoint selector 100 may be of the type shown and described in assignee's above-mentioned co-pending application Ser. No. 219,992, filed Jan. 24, 1972, and supplies over lead 98 a 30 Hz since wave having a magnitude proportional to /B/ and a phase relative to the ZDR representative of $\phi_B$.

Computer 90 produces a pair of output signals on leads 102 and 104, both of which are 30 Hz sine waves having a magnitude proportional to /C/ and a phase relative to ZDR indicative of $\phi_C$. This signal is supplied over lead 104 to the distance generator 86 which detects the magnitude of the C vector output from computer 90 and supplies a voltage signal to the range portion of the display proportional to the magnitude of the C vector signal on lead 104. The C vector signal is also supplied by a lead 102 to the input of "C" phase generator 84. In addition to the C vector signal, "C" phase generator 84 also receives the VOR video from VOR converter 42 by way of leads 44, 94, and additional lead 106, as well as a DC reference voltage from voltage standard source 108 by way of lead 110. The C vector signal on lead 102 is normalized, i.e., given a constant amplitude in "C" phase generator 84, in conjunction with the reference voltage from source 108, and is then combined in the "C" phase generator 84 with a portion of the 9,960 Hz component of the VOR video to produce a reconstructed VOR video at its output on lead 112 which is in all respects identical to the original VOR video with the exception that the phase of the 30 Hz amplitude modulating sinesoid is now representative of the C vector, i.e., $\phi_C$ rather than $\phi_A$. This reconstructed composite video on lead 112 is supplied through switch 58 to the VOR converter 62 and finally to the bearing portion of the cockpit display 66, where it is displayed in exactly the same manner as in straight VOR. The difference is that the course deviation displayed in display 66 is with respect to the C vector instead of the A vector.

Figure 4:
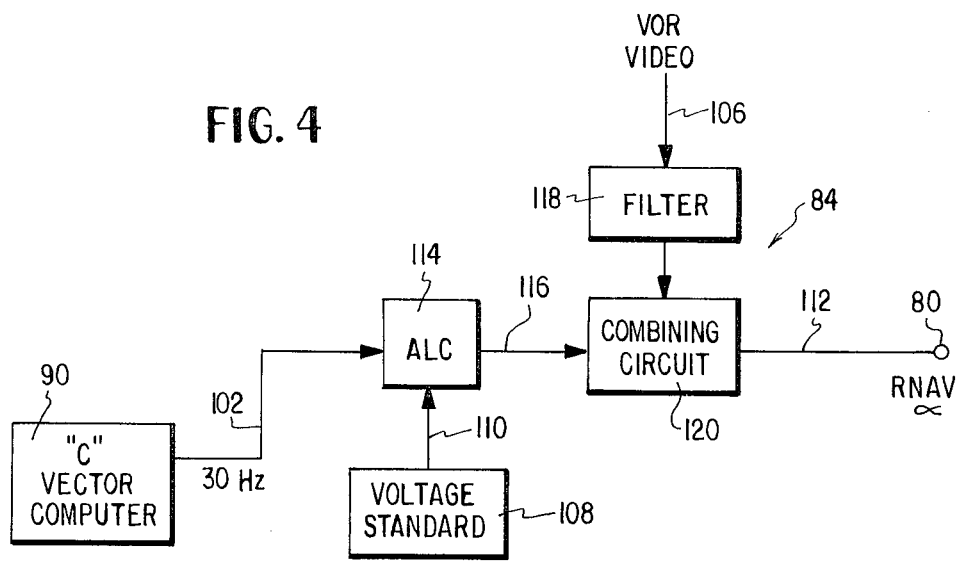
FIG. 4 is a more detailed block diagram illustrating some of the components of the "C" phase generator of FIG. 2.

FIG. 4 is a more detailed block diagram showing some of the major components of the "C" phase generator 84 of FIG. 2. In FIG. 4 like parts bear like reference numerals. The C vector signal on lead 102 is supplied from "C" vector computer 90 to an automatic level control (ALC) circuit 114 which produces a "C" phase sinusoid on its output lead 116 having a substantially constant amplitude as determined by the reference voltage from standard 108. ALC circuit 114 is an automatic gain control circuit for stabilizing the level of the C phase signal on lead 116. The VOR video on lead 106 is applied to a 30 Hz AM filter 118 which removes the amplitude modulation at 30 Hz from the VOR video. This amplitude modulation is reintroduced in combining circuit 120 in which the amplitude modulation representative of the A phase removed by filter 118 is replaced by amplitude modulation representative of the C phase as applied to the combining circuit 120 over lead 116. The resulting output on the lead 112 is a reconstructed VOR video which is in all respects identical to the original VOR video with the exception that the 30 Hz "A" phase amplitude modulating signal has been replaced by a similar signal having the phase of the C vector.

FIGS. 5A and 5B taken together constitute a more detailed block diagram of the area navigation system of FIGS. 2 and 4 and like parts in FIGS. 5A and 5B bear like reference numerals. FIGS. 5A and 5B illustrate only the area navigation portion of the system, it being understood that the VOR and DME sections are of conventional construction as illustrated in FIG. 2.

Referring to FIGS. 5A and 5B, the DME receiver 40 is of conventional construction and produces outputs on three different leads, namely a suppression pulse output on lead 122, a range memory pulse on lead 124, and a memory pulse on lead 126 in a well known manner. These are supplied to a signal conditioner 128. This signal conditioner may be separate as illustrated or may be incorporated in the conventional DME receiver 40. The output from the signal conditioner 128 is a series of pulses as indicated at 130 with the pulse width of each pulse indicative of the range from the VORTAC station to the aircraft. These pulses are applied by way of a lead 132 to a DME lock loss detector 134 forming part of a diagnostic circuit as more fully described below and by way of a lead 136 to a digital-to-analog converter 138. Converter 138 produces at its output an analog signal on lead 92 which is applied to the input of a "C" vector summation filter 140, forming the "C" vector computer 90. FIGS. 5A and 5B show VOR receiver No. 1 at 42 and a second VOR receiver No. 2 at 42'. This is to illustrate that the system of the present invention is fully compatible with different types of VOR or "NAV" receivers, which are not all standardized and which may have different output characteristics. A switch 142 is illustrated for connection to one or the other VOR receivers but it is understood that only a single VOR receiver is used at any given time and if compatibility with more than one VOR is not desired the switch may be eliminated. The output from the VOR is applied through switch 142 to a level and phase selector 144 which selects the level and phase of its output signal in accordance with the position of a switch 146 which is, again, dependent upon whether the system is connected to a VOR receiver No. 1 or VOR receiver No. 2. If this selectability is not desired switch 146 may be replaced by a jumper wire. From the level and phase selector 144 the VOR video signal passes through a buffer 148 and automatic level control 150 (ALC) to a limiting FM detector 152. Detector 152 detects the FM signal on the VOR video which is a 30 Hz reference phase signal and applies this through a 30 Hz sine wave filter 154, a squarer 156, and a pulse former 158 to produce a very accurate series of zero degree reference pulses (ZDR) on lead 160 for application to the waypoint selector generally indicated at 100.

The amplitude level controlled VOR video is also applied from automatic level control 150 by way of a lead 162 to an AM detector 164. This detector detects the variable phase 30 Hz amplitude modulation on the VOR video and applies this variable phase 30 Hz signal to a squarer 166. A phase adjustment indicated by knob 168 is incorporated in detector 164 to adjust the phase in accordance with whether VOR receiver No. 1 or VOR receiver No. 2 is being used. From the squarer 166 the A phase signal is passed through a phase averaging circuit 170 which produces on its output lead 172 a phase averaged variable A phase signal. This is applied to another input of "C" vector summation filter 140.

Waypoint selector 100 comprises a waypoint No. 1 selector 174 and a waypoint No. 2 selector 176. Two selectors are shown since it is often desirable to set up a second waypoint while navigating to the first to avoid difficulties in switching over from the first to the second as the first one is being passed. A suitable cockpit switch (not shown) may be provided to switch from one to the other selector or if desired only a single waypoint selector may be utilzed. Waypoint selector No. 1 provides a voltage $V_1$ representative of the selected range from the VORTAC station to the waypoint by way of a lead 178 to summation filter 140. A second voltage signal from waypoint selector No. 2 is similarly applied over lead 180. A 30 Hz signal developed from the ZDR having the desired phase ($\phi_1$) representative of the bearing from the VORTAC to the first waypoint is applied by a lead 182 to a waypoint signal generator 184 which generates an accurate square wave having this phase and applies it over a lead 186 to the summation filter. A similar 30 Hz signal having the phase $\phi_2$ is applied from the second waypoint selector 176 by way of a lead 188 to waypoint signal generator 184 and a squared version of this signal is applied by a lead 190 to the summation filter. The range signals $V_1$ and $V_2$ are DC voltage levels and these are combined in the "C" vector summation filter along with the other inputs to produce a "C" vector output on lead 192. Filter 140 is a sine wave filter and its output on lead 192 is the C vector signal which is applied through a buffer 194 to a phase shift and phase trim circuit 196. The setting of this circuit again depends upon whether VOR receiver No. 1 or VOR receiver No. 2 is being used and a switch 198 is provided to set the circuit accordingly. From this circuit the 30 Hz C vector signal is amplitude controlled in the "C" phase automatic level control circuit 114. This is an automatic gain control circuit and sets the amplitude level of the C vector signal at a constant value in accordance with a reference potential derived from the voltage standard source 108 of FIG. 2.

The raw or unlevelled VOR video is taken from the output of buffer 148 by way of a lead 198 and passes through high-pass filter 118 which removes the "A" phase amplitude modulation from the VOR video. The A phase of the AM modulation removed by high-pass filter 118 is replaced by the "C" phase which is amplitude modulated back on to the VOR video in recombining circuit 120. The output from circuit 120 on lead 200 is the reconstructed VOR video and this is applied to a level and phase selector circuit 202 which is provided with a switch 204 to level and phase the output in accordance with the type of VOR converter being used. Again, VOR converters are not all standard and the two common types are those accepting ARINC standard signals and NARCO/ARC signals and circuit 202 is set by switch 204 accordingly. The level and phase select signal is applied to the VOR converter 62 which drives over lead 206 and lead 208 a conventional course deviation indicator (CDI) 210.

The C vector signal from the output of buffer 194 is applied to the distance generator circuit 86 which comprises a peak detector 212 for sensing the peaks or amplitude of the 30 Hz $\overline{C}$ signal, a 90° phase shift circuit 214, and an analog-to-digital converter 216. The A/D converter drives a digital range and mode (DRM) indicator 218. This indicator displays the range in digital form, preferably in nautical miles. By way of example only, the digital display of the DRM may comprise a seven-bar segment array of electro-optical display elements such as lights, light emiting diodes, or liquid crystals. In the preferred embodiment small lights are employed.

Also incorporated in the circuit of FIGS. 5A and 5B is a diagnostic circuit including the DME lock loss detector 134 previously described. When the DME signals for any reason fail to appear at the input to circuit 134, this circuit produces a change in potential on its output lead 220 which is applied to a DME signal loss detector 222. This latter circuit applied a signal over lead 224 to a diagnostic detector 226, which applies a blanking signal over lead 228 to DRM 218 blanking or erasing the digital display and also energizes a DME loss light 230 on the display by way of a lead 232. If for any reason the VOR video signal is lost, this loss is sensed by a VOR video loss detector 234 also forming part of the diagnostic circuit which is connected to the output of buffer 148 by way of lead 198 and a second lead 236. When the VOR signal is lost an output appears upon lead 238 again actuating diagnostic detector 226 producing a blanking signal on lead 228 and energizing VOR loss lamp 240 on the DRM display by way of lead 242. Finally, should the amplitude of the C vector signal fall too low indicating that the waypoint range is too great, such as by way of example only over about 200 miles, this is sensed by the DMW overrange detector 244. When the range from the selected waypoint is too great a signal appears on lead 246 energizing diagnostic detector 226 to blank the DRM range display by way of lead 228 and to energize the overrange lamp 248 by way of lead 250. Thus, in the event of a loss of VOR signal, a loss of DME signal, or the selection of a waypoint too far away, not only is the range display blanked to warn the pilot but at the same time the appropriate light on the display is energized to indicate the cause of the trouble.

FIG. 6 illustrated CDI damping as incorporated in the system of the present invention and illustrates an approach mode switch which may be used by the pilot when he wishes to land at or near a waypoint. In FIG. 6 like parts bear like reference numerals. As previously described, VOR converter 62 is connected by way of leads 206 and 208 to drive the course deviation indicator (CDI) 210. Ganged with switches 58 and 70 of FIG. 2 is a damping switch 252 which is open for a straight VOR/DME navigation but is closed when the pilot switches to "RNAV$\alpha$" or area navigation. When switch 252 is closed a capacitor 254 is placed across the CDI to dampen it and lessen its sensitivity to extreme and rapid variations or fluctuations in course deviation. When the pilot wishes to fly in the approach mode he closes a second or approach switch 256 provided on the DRM 218 which additionally connects a variable resistor 258 across the CDI input terminals. The value of resistor 258 is selected so that the maximum sensitivity of the CDI is substantially constant at preferably about ±30°. By way of example only, approach mode signal switch 252 may be in the form of a push button switch on the DRM 218 and preferably establishes an approach mode operation for the CDI in which the maximum CDI sensitivity approximates an equilateral triangle such that the course width maximum sensitivity approximately equals the distance to the waypoint.

FIGS. 7A, 7B and 7C taken together constitute a detailed circuit diagram of the VOR/DME portion of the system, i.e., that portion of the system enclosed in the dashed box 258 of FIGS. 5A and 5B. Like parts in FIGS. 7A, 7B and 7C bear like reference numerals. Referring to FIGS. 7A, 7B and 7C, the level and phase selector 144 and buffer 148 are combined in a single circuit and enclosed by the dashed box labeled with these numbers. If the circuit is connected to the VOR receiver No. 1, then terminal 260 is grounded. If the circuit is connected to VOR receiver No. 2 then terminal 262 is grounded. The VOR video is applied to the circuit input terminal 264. The ALC circuit in FIGS. 7A, 7B and 7C is enclosed in the dashed box 60 and this in an automatic gain control circuit for level controlling the signal. The FM detector and limiter is enclosed by the dashed box 152 and this feeds the 30 Hz sine wave filter enclosed by the dashed box 34. Squaring circuit 156 is connected to the output of the filter and this feeds a pulse former 158 in the form of a one-shot multivibrator. The output on lead 160 is the zero degrees reference signal (ZDR).

From the output of the buffer 148 the signal is supplied by lead 198 to the AM detector 164. Again, one of the terminals 268 or 270 is grounded in accordance with whether the circuit is connected to VOR receiver No. 1 or VOR receiver No. 2. Phase adjustment is accomplished through the adjustment of the variable resistors 272 and 274. From this circuit the C phase signal is fed to the squarer 166 and is fed by way of lead 160 to the phase averaging circuit 170 of FIGS. 5A and 5B.

The DE signal from the conditioner 128 is applied to input terminal 276 and passes by way of lead 132 to the DME lock loss detector 134 and by way of lead 136 to the digital-to-analog converter 138. The D/A converter includes a takeout circuit generally indicated at 278 which takes out a 50 microsecond delay incorporated in the DME receiver pulse signal. The output from the digital-to-analog converter is through a switch 280 which connects to the output lead 92. Switch 280 has a second position for connecting the output to a voltage divider 282 used for initial setup of the circuit to establish a fixed range such as 50 miles for test purposes.

FIGS. 8A, 8B, 8C, and 8D taken together constitute a detailed circuit diagram for the computer portion of the circuit, i.e., that portion enclosed in dashed box 284 in FIGS. 5A and 5B. The C vector filter is enclosed in dashed box 140 in FIGS. 8A, 8B and 8C and this filter receives an analog signal representing the magnitude of the A vector over lead 92 which passes through a chopper generally indicated at 286 as including FET Q2 where it is converted into AC for reception by C vector filter 240. The B vector magnitude level from waypoint selector No. 1 appears on lead 78 and this similarly passes through a chopper 288 to the C vector filter. The DC magnitude level from waypoint selector No. 2 appears on lead 180 and passes through chopper 290 to the C vector filter. The B vector bearing or "B" phase signal from waypoint selector No. 1 is on lead 186 and the "B" phase signal from waypoint selector No. 2 is on lead 190, both being applied to the C vector filter 140. The signal from the C vector filter which is a sine wave filter passes to buffer 194 and from there to a phase shift and trim circuit 196. This circuit is connected to phase trim No. 1 lead 292 and to phase trim No. 2 lead 294 in accordance with whether the system is connected to VOR receiver No. 1 or VOR receiver No. 2 of the FIGS. 5A and 5B. Next the signal passes to the "C" phase automatic level control 114 which is an automatic gain control circuit. This circuit feeds the recombine circuit 120 which in turn is connected to the level and phase selector circuit 102, again having ARINC lead 296 and a NARCO lead 298 in accordance with the desired level and phase of the output. The reconstituted VOR video or "RNAVα" signal for application to the VOR converter 62 in FIGS. 5A and 5B appears on output lead 300.

The VOR loss circuit is enclosed in dashed box 234 and this circuit feeds the diagnostic detector 226. The blanking output is on lead 228 and the VOR loss output for energizing the VOR lamp is illustrated at 242. The DMW overrange circuit illustrated at 244, and the DME loss circuit at 222, both feed the diagnostic detector 226. The DMW lamp is energized over lead 250 and the diagnostic lamp is energized over lead 232. The circuit of FIGS. 8A, 8B and 8C includes input lead 302 feeding the diagnostic detector for supplying a 1 Hz signal to the detector to flash the respective diagnostic lamp when it is energized.

The "A" phase signal or the signal representing the phase or bearing of the A vector appears on input lead 172 and this passes through suitable logic circuitry and by way of a lead 304 to the input of the C vector filter 140. The signal from the DME lock loss detector is on lead 220 and the circuit of FIGS. 8A, 8B and 8C shows an auxiliary DME input lead 306 useful for test purposes.

A signal from the buffer 194 is applied by way of a lead 308 to the input of the sample-and-hold peak detector indicated by the dashed box 212. This circuit includes a one-shot multivibrator 310 producing at its output a sample command, and a holding capacitor 312. The 90° phase shift circuit is enclosed by dashed box 214. The output of the peak detector goes to the DMW overrange circuit 244 by way of a lead 314 and also appears at output lead 316 for application to the A/D converter 216 of FIGS. 5A and 5B. A test circuit is generally indicated at 318 and this is connected to a test lead 320. A test switch for testing the circuit by connecting it to a −15 volts is illustrated at 322.

Figure 9B:
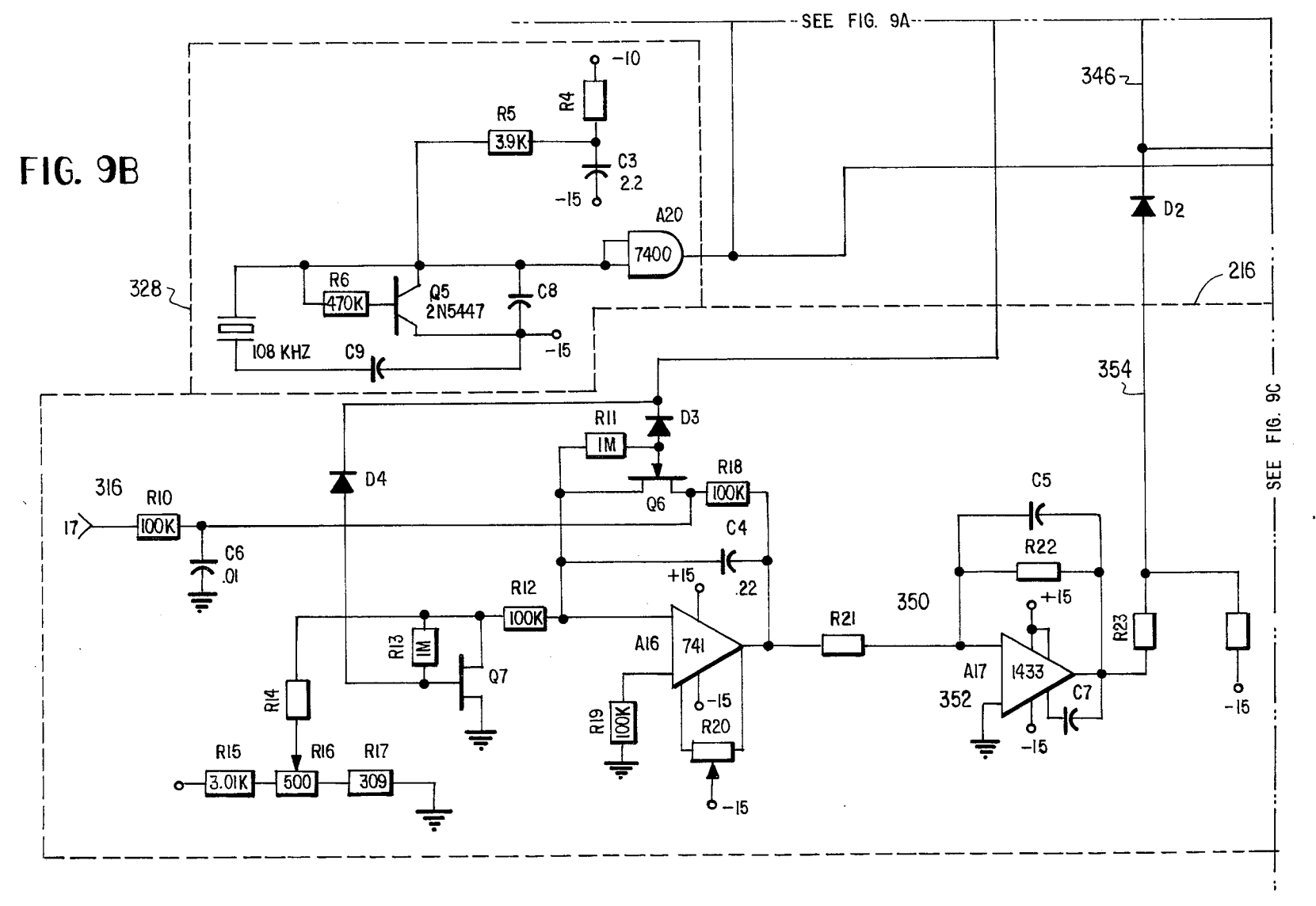

FIGS. 9A, 9B and 9C taken together are a detailed circuit diagram of remaining portions of the system including the waypoint selector circuits and the analog-to-digital converter 216 of FIGS. 5A and 5B. Referring to FIGS. 9A, 9B and 9C, the ZDR pulses from lead 160 are applied through the waypoint selectors to a waypoint select logic circuit 324 so that one or the other set of pulses is passed depending upon the waypoint selection made, i.e., whether waypoint No. 1 or waypoint No. 2 is being used. The setting of a waypoint select switch (not shown) applies a signal to lead 326 which causes circuit 325 to pass one or the other set of pulses from the waypoint selector, i.e., either pulses from waypoint selector 174 in FIGS. 5A and 5B or waypoint selector 176, having an appropriate phase in accordance with the setting of the selector. These pulses are applied to the waypoint signal generator 184 which is a 30 Hz square wave generator. This generator receives a signal from an 108 kHz oscillator 328 which acts as a burst oscillator for the square wave generator 184 so that the generator acts as a precision 30 Hz generator and produces a precise square wave output at 30 Hz. Oscillator 328 has a separate output lead 330 which feeds the phase averaging circuit 170 of FIGS. 5A and 5B. From the waypoint signal generator 184 the selected phase signal is passed through a pair of dividers 332 and 334 which divide by 5 and divide by 6, respectively, to produce a 1 Hz output on lead 336. A waypoint lamp driver circuit is illustrated at 338 and these are provided with output leads 340 and 342 for actuating the waypoint indicator light, i.e., the operating waypoint selector has its light illuminated to provide a proper indication to the pilot as to which waypoint is being used. The bearing or phase signals for application to the C vector summation filter 140 of FIGS. 5A and 5B appear on output leads 186 and 190. The 1 Hz output lead 302 is coupled to the output of divider 334 for flashing the diagnostic lamps as previously described.

The 1 Hz signal on lead 336 is also applied to the analog-to-digital converter 216 as a start command to the converter. This converter comprises a ramp generator and the start command starts the ramp with the A/D converter receiving the range signal input on lead 316. The range signal or DMW signal defines the DC level from which the ramp starts. The A/D converter includes a plurality of counters generally indicated at 344 and the 1 Hz signal is applied by way of the lead 346 to open the gates 348 to the counters. The ramp is built up on lead 350 connected to one input of comparator 352 and when the ramp crosses ground potential an output from the comparator appears on lead 354 closing the gate to the counters 344. The counters are reset by a signal on lead 356 and the counters also receive a transfer data signal over lead 358. The digital output from the counters on leads 360 is in suitable format for application to the decoder seven-segment drivers in the DRM 218 of FIGS. 5A and 5B. The counters are adapted to receive a zeroing command from lead 362 as the aircraft passes within 0.5 miles and on over the waypoint.

It is apparent from the above that the present invention provides an improved area navigation system and particularly one that is completely compatible with existing VORTAC equipment, i.e., the conventional VOR/DME on board navigation devices. The system is designed to supplement existing VOR/DME equipment in that it offers an area navigation capability so that the pilot may fly to arbitrarily selected waypoints and need not fly the crowded airlanes from VORTAC to VORTAC. Of particular importance, the present invention provides auch a system in which the output signal containing the bearing information from the waypoint is a reconstituted VOR video which may be applied in a conventional manner to a VOR converter and from there to an angular course deviation display. The angular display offers many advantages including not only a compatibility with existing equipment but provides a display with which the pilot is generally already familiar from previous VOR navigation experience. Other advantages of angular course deviation displays reside in the fact that the display in effect becomes more sensitive as the waypoint is approached and thus gives a more accurate reading at closer ranges where these readings are necessary and desirable. Further it makes it possible for the pilot to avoid excessive corrections to get back on course since he may simply fly in a direct line to the waypoint, even though off-course, as long as he remains near the desired course and within the sensitivity range of the bearing display instrument or CDI. Additionally, the area navigation capability makes it possible to directly drive a conventional RMI displaying heading information as well as bearing. Also, by incorporating an approach mode switch it is possible when the pilot desires to land at or near the waypoint to maintain a substantially constant maximum angular sensitivity for the CDI in a simplified manner so as to facilitate pilot landing procedures at a waypoint.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An angle mode area navigation system comprising a first input terminal for receiving station-to-aircraft vector angle information, a second input terminal for receiving station-to-aircraft vector magnitude information, a waypoint-to-aircraft vector computer coupled to said first and second input terminals, a station-to-waypoint vector generator coupled to said computer whereby said computer produces at its output an electrical signal representative of the corresponding waypoint-to-aircraft vector, a distance generator coupled to the output of said computer for developing a distance display signal from said computer output, and an angle generator coupled to the output of said computer for developing an angle display signal from said computer output, said angle generator generating a VOR video signal with information representative of the angle of said waypoint-to-aircraft vector for application to a VOR converter.

2. A system according to claim 1, wherein said waypoint-to-aircraft vector computer is an analog computer.

3. A system according to claim 2, wherein said computer is a sine wave summation filter.

4. A system according to claim 1, wherein said VOR video signal comprises a 9,960 Hz subcarrier amplitude modulated by a 30 Hz sine wave having a phase indicative of the angle of said waypoint-to-aircraft vector.

5. A system according to claim 4, wherein said VOR video subcarrier is frequency modulated by a 30 Hz reference phase sine wave.

6. A system according to claim 1, wherein said angle generator comprises an automatic level control circuit coupled to the output of said computer, a combining circuit coupled to the output of said automatic level control circuit, and means coupling said combining circuit to said first input terminal.

7. A system according to claim 6, wherein said coupling means comprises a high pass filter for passing a frequency modulated VOR video subcarrier.

8. A system according to claim 7, wherein said automatic level control circuit includes automatic gain control.

9. An angle mode area navigation system comprising a VOR input terminal for receiving A vector angle information, a DME input terminal for receiving A vector magnitude information, a C vector computer coupled to said VOR and DME input terminals, a B vector signal generator coupled to said computer whereby said computer produces at its output a signal representative of the C vector corresponding to said A AND B vectors, said C vector signal having an amplitude representative of the magnitude of said C vector and a phase representative of the angle of said C vector, first means coupled to the output of said computer for developing a distance display signal proportional to the magnitude of said C vector signal, and second means coupled to the output of said computer for developing an angular display signal proportional to the phase of said C vector signal, said C vector signal comprising a 30 Hz sine wave, said second means comprising a combining circuit for combining a 30 Hz sine wave signal possessing the phase of said C vector signal with a 9,960 Hz signal having a reference phase.

10. A system according to claim 9 wherein said first means comprises a peak detector for sensing the magnitude of said 30 Hz sine wave.

11. A system according to claim 9, including means for coupling the output of said combining circuit to a VOR converter.

12. A system according to claim 9, including a VOR receiver coupled to said VOR input terminal, a DME receiver coupled to said DME input terminal, a VOR converter coupled to the output of said second means, and a digital range display coupled to the output of said first means.

13. A system according to claim 12, including an angular bearing display coupled to the output of said VOR converter.

14. A system according to claim 13, wherein said digital range display comprises a plurality of electro-optical display elements.

15. A system according to claim 14, wherein said elements are arranged in a 7-bar segment array.

16. A system according to claim 13, wherein said digital range display comprises a meter for displaying range.

17. A system according to claim 13, wherein said angular bearing display comprises a course deviation indicator.

18. A system according to claim 13, wherein said angular bearing display comprises a radio magnetic indicator.

19. An angle mode area navigation system comprising a VOR receiver, a DME receiver, a C vector computer, means coupling said receivers to the input of said computer, a way point selector coupled to the input of said computer, a VOR video signal generator coupled to the output of said computer, a VOR converter coupled to the output of said video signal generator, and a CDI coupled to the output of said converter.

20. A system according to claim 19, including a damping capacitor coupled across the input of said CDI.

21. A system according to claim 19, including a range indicator coupled to the output of said computer.

22. A system according to claim 21, including first switch means between said VOR receiver and said CDI for selectively bypassing said C vector computer, and second switch means between said DME receiver and said range indicator for selectively bypassing said C vector computer.

23. A system according to claim 22, wherein said first and second switch means are ganged together.

24. A system according to claim 21, including a variable resistor, and approach mode switch means carried by said range indicator for coupling said variable resistor across the input of said CDI.

25. A system according to claim 24, wherein said resistor provides a substantially constant maximum angular sensitivity for said CDI.

26. A system according to claim 25, wherein said sensitivity is approximately ±30°.

27. A system according to claim 21, wherein said range indicator has at least one diagnostic light for indicating loss of a signal in the system.

28. A system according to claim 27, including means coupled to said range indicator for blanking its display when said diagnostic light is energized.

29. A system according to claim 27, wherein said range indicator includes a DME signal loss light, a VOR signal loss light and a DMW overrange light.

* * * * *

PO-1050
(5/69)

UNITED STATES PATENT OFFICE
CERTIFICATE OF CORRECTION

Patent No. 3,796,867            Dated March 12, 1974

Inventor(s)    Albert C. Abnett and Robert M. Watson

It is certified that error appears in the above-identified patent and that said Letters Patent are hereby corrected as shown below:

Column 3, line 25, "9,969" should read --9,960--; line 50, "whicn" should read --which--.
Column 5, line 3, "in" should read --if--.
Column 7, line 27, "since" should read --sine--.
Column 9, line 26 "utilzed" should read --utilized--.
Column 10, line 28, "applied" should read --applies--; line 55, "illustrated" should read --illustrates--.
Column 11, line 47, "DE" should read --DME--.
Column 12, line 1, "240" should read --140--.
Column 13, line 3, "325" should read --324--.
Column 15, line 16, claim 9, "A AND B" should read --A and B--.

Signed and sealed this 24th day of September 1974.

(SEAL)
Attest:

McCOY M. GIBSON JR.            C. MARSHALL DANN
Attesting Officer             Commissioner of Patents